US009471508B1

United States Patent
Kauer et al.

(10) Patent No.: US 9,471,508 B1
(45) Date of Patent: Oct. 18, 2016

(54) MAINTAINING COMMAND ORDER OF ADDRESS TRANSLATION CACHE MISSES AND SUBSEQUENT HITS

(71) Applicant: International Business Machines Corporation, Armonk, NY (US)

(72) Inventors: David M. Kauer, Rochester, MN (US); Lonny J. Lambrecht, Byron, MN (US); Daniel Ramirez, Rochester, MN (US); Zelun Tie, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 22 days.

(21) Appl. No.: 14/682,208

(22) Filed: Apr. 9, 2015

(51) Int. Cl.
*G06F 12/02* (2006.01)
*G06F 12/10* (2016.01)
*H04L 12/743* (2013.01)

(52) U.S. Cl.
CPC ....... *G06F 12/1027* (2013.01); *G06F 12/1018* (2013.01); *H04L 45/7453* (2013.01); *H04L 45/7457* (2013.01); *G06F 2212/657* (2013.01); *G06F 2212/684* (2013.01)

(58) Field of Classification Search
CPC .......... G06F 12/1027; G06F 12/1018; H04L 45/7453; H04L 45/7457
USPC ........ 711/108, 154, 156, 158, 202, 206, 216
See application file for complete search history.

(56) References Cited

U.S. PATENT DOCUMENTS

| | | | |
|---|---|---|---|
| 6,119,121 A | 9/2000 | Zhu | |
| 6,775,764 B1* | 8/2004 | Batcher | G06F 9/30043 707/999.003 |
| 6,965,962 B2 | 11/2005 | Sheaffer | |
| 7,343,477 B1* | 3/2008 | Thatipelli | G06F 9/3826 712/218 |
| 7,418,543 B2* | 8/2008 | Jain | G11C 15/00 365/49.1 |
| 7,467,256 B2* | 12/2008 | Jain | H04L 45/7453 365/49.1 |
| 7,657,706 B2 | 2/2010 | Iyer et al. | |
| 8,065,504 B2* | 11/2011 | Yates, Jr. | G06F 9/45533 703/26 |
| 8,499,105 B2 | 7/2013 | Wang | |
| 8,631,225 B2 | 1/2014 | Chen et al. | |

(Continued)

FOREIGN PATENT DOCUMENTS

CN 102098221 A 6/2011

OTHER PUBLICATIONS

Disclosed anonymously, "LRU like cache management with page stamp that increments based on access patterns", Ip.com No. IPCOM000153138D, May 24, 2007, 7 pages.

(Continued)

*Primary Examiner* — Stephen Elmore
(74) *Attorney, Agent, or Firm* — Cantor Colburn LLP

(57) ABSTRACT

A computer-implemented method includes storing commands and maintaining an order of receipt of the commands in a command processing unit. The commands include address translation cache miss commands that are organized as one or more linked lists and stored in a content-addressable memory (CAM). All nodes within a single linked list include commands having addresses that map to the same hash value. Based on receiving a memory fetch completion indicator for a cache entry for a command in a head node in a linked list, all of the commands in the linked list are returned. The returning includes sending the commands in the linked list to an address translation unit in an order specified by the linked list.

13 Claims, 5 Drawing Sheets

(56) References Cited

U.S. PATENT DOCUMENTS

| | | | |
|---|---|---|---|
| 8,804,752 B2* | 8/2014 | Manula | H04L 12/28 370/412 |
| 2006/0136681 A1* | 6/2006 | Jain | G06F 13/1673 711/154 |
| 2014/0153571 A1 | 6/2014 | Neugebauer et al. | |
| 2014/0195771 A1 | 7/2014 | Adderly et al. | |
| 2014/0372628 A1* | 12/2014 | Jorgensen | G06F 13/00 709/245 |
| 2014/0372691 A1* | 12/2014 | Jorgensen | G06F 11/348 711/105 |

OTHER PUBLICATIONS

David M. Kauer, et al., Pending U.S. Appl. No. 14/833,161 entitled "Maintaining Command Order of Address Translation Cache Misses and Subsequent Hits" filed Aug. 24, 2015.

* cited by examiner

MAINTAINING COMMAND ORDER OF ADDRESS TRANSLATION CACHE MISSES AND SUBSEQUENT HITS

BACKGROUND

Various embodiments of this disclosure relate to data processing and, more particularly, to maintaining command order of address translation cache misses and subsequent hits.

Load and store commands in an input/output (I/O) subsystem target multiple sources and destinations, respectively. A virtual channel number distinguishes these target sources and destinations. All commands that share a virtual channel number are required to maintain a user defined order which may range from relaxed to strict ordering. The ordering policy is not known until after address translation is complete so it is assumed that a strict ordering policy is used through the translation process, which means that all commands must complete in the order that the command is issued within a virtual channel. Commands with different virtual channels can complete in a different order or can pass each other.

Incoming load and store commands signal to the I/O interface a virtual address which corresponds to that I/O subsystem's view of memory. This virtual address needs to be translated into a real address corresponding to the processor's view of the memory map.

Typically an address translation cache is used as part of the translation process to take advantage of the temporal and spatial locality of the I/O command addressing. In a system where the address translation unit uses a cache to hold the translation table entries, a cache miss will affect the command flow due to the added time required for performing a memory fetch and then re-translation of the address of the corresponding command.

SUMMARY

Embodiments include methods, systems, and computer program products for maintaining command order of address translation cache misses and subsequent hits. A method includes storing commands and maintaining an order of receipt of the commands in a command processing unit. The commands include address translation cache miss commands that are organized as one or more linked lists and stored in a content-addressable memory (CAM). All nodes within a single linked list include commands having addresses that map to the same hash value. Based on receiving a memory fetch completion indicator for a cache entry for a command in a head node in a linked list, all of the commands in the linked list are returned. The returning includes sending the commands in the linked list to an address translation unit in an order specified by the linked list. Based on receiving an incoming command, a CAM-lookup is performed to determine if an address included in the incoming command maps to a hash value that matches a hash value of a node in one of the linked lists. Based on determining that the address included in the incoming command maps to a hash value that matches a hash value of a node in one of the linked lists, the command is added to the linked list. Based on determining that the address included in the incoming command does not map to a hash value that matches a hash value in one of the linked lists, the incoming command is sent to the address translation unit.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1A:
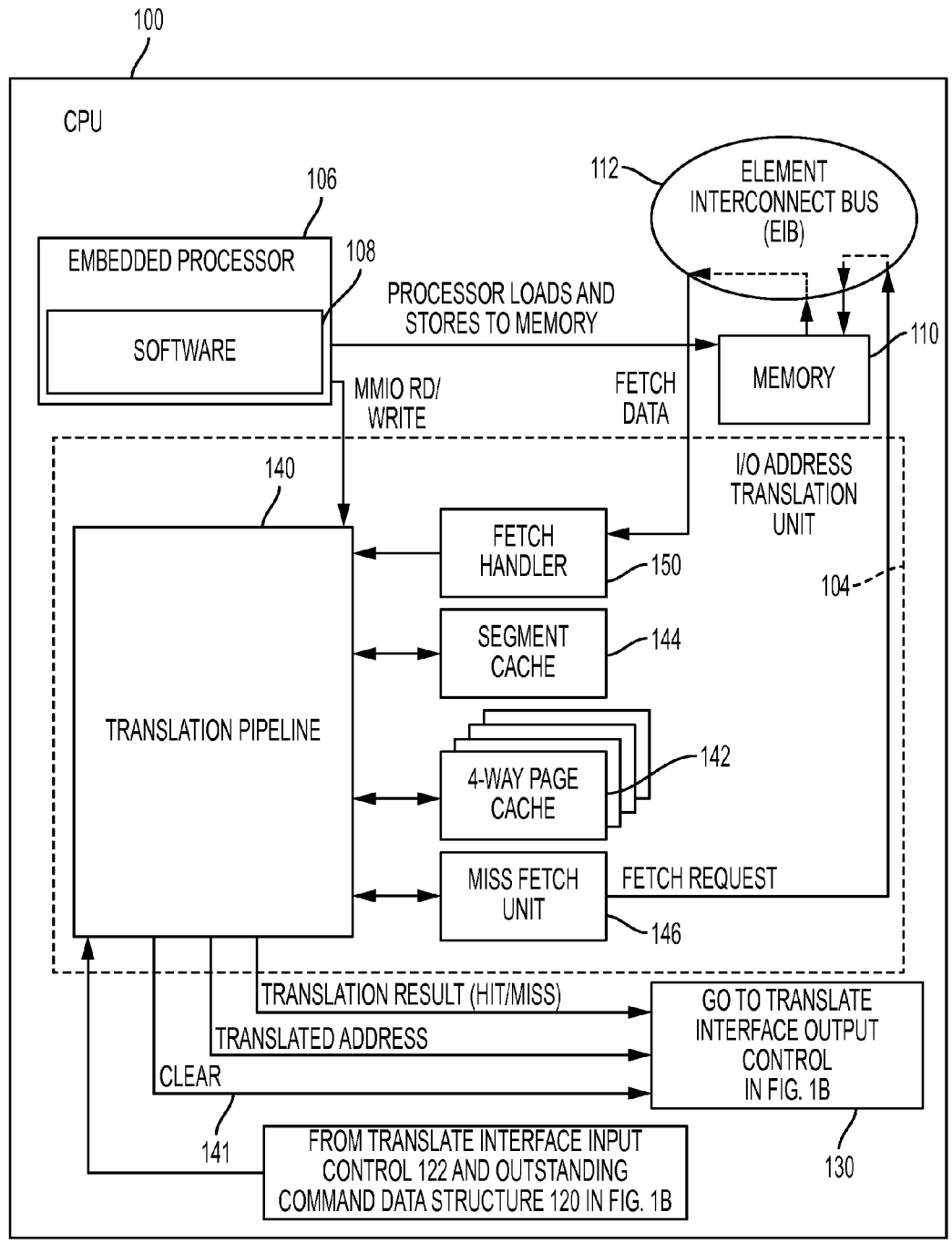
FIGS. 1A and 1B together depict an apparatus for maintaining command order of address translation cache misses and subsequent hits via a dynamic linked list in accordance with an embodiment.

According to embodiments, the command order of address translation cache misses and subsequent hits is maintained using a dynamic linked-list structure. Embodiments allow an N-entry memory structure to have a single linked list with N-nodes, N-linked lists with a single node, or any combination of the two using the same hardware resources in order to maintain command order of address translation cache misses and subsequent hits via a dynamic linked-list structure.

One approach to maintaining the command order of address translation cache misses and subsequent hits includes keeping track of head, tail, free, and next pointers in a memory structure. This requires additional memory to keep track of different pointers and therefore more power and area resources are used. This approach maps a unique linked list to each entry in a memory structure. However, it does not efficiently scale because a head and tail pointer need to be stored for each entry.

Another approach is to use a single list to keep track of all outstanding address translation commands. All commands complete in the order that they are received. This approach can have limitations because commands that map to the same page may not be received consecutively. For example, if a command has completed and mapped to a first page, then another command that also mapped to the first page must wait for commands above it to complete even if they are mapped to different pages. Thus, this approach does not take advantage of the temporal locality of the cache.

Embodiments described herein do not have memory structures dedicated to track tail or free pointers. This has an advantage in both power and area reduction. Instead of using tail and free pointers as described above, embodiments use a head and a tail bit to identify linked lists. This allows the creation of as many unique linked lists as there are command entries. In addition, embodiments can take advantage of temporal cache locality because each command in a dependency list can be returned after a memory fetch is completed. This can result in better overall performance due to less cache misses and, therefore, less memory fetches.

Embodiments can keep multiple, unique linked lists (dependency lists) of address translation cache miss commands in the order they were received. When a memory fetch is completed for a head entry in a dependency list, all commands within that list can be retranslated.

In an embodiment, incoming commands are added to a linked list if they have an address that maps to the same hash as an address for a previous command in the linked list. In an embodiment, the address of every incoming command is checked against a previous outstanding command's hash to find a match. In an embodiment, this can be done using a content addressable memory (CAM) lookup where the hash of the command address in each tail node of the CAM is compared against the hash of an address of the incoming command.

As used herein, the term "address" refers to a virtual address that is specified by a command. The address is located on a particular "page" which corresponds to a physical location in the memory. A "hash" or "hash value" of the address refers to the hashed value of the page. Therefore, the terms "hash" or "hash value" are derived from the page number. There may be multiple pages that map to the same hash value. In an embodiment, a page is the unit that is fetched from the physical memory and several addresses (dependent on page size and address size) can point to the same page. For descriptive purposes, embodiments are described herein with reference to systems where the fetch unit is a page and the commands are assigned to linked lists based on addresses pointing to a common fetch unit (e.g., page). Embodiments can also be applied to systems having different fetch units such as a block or a specific number of bytes.

Figure 1B:
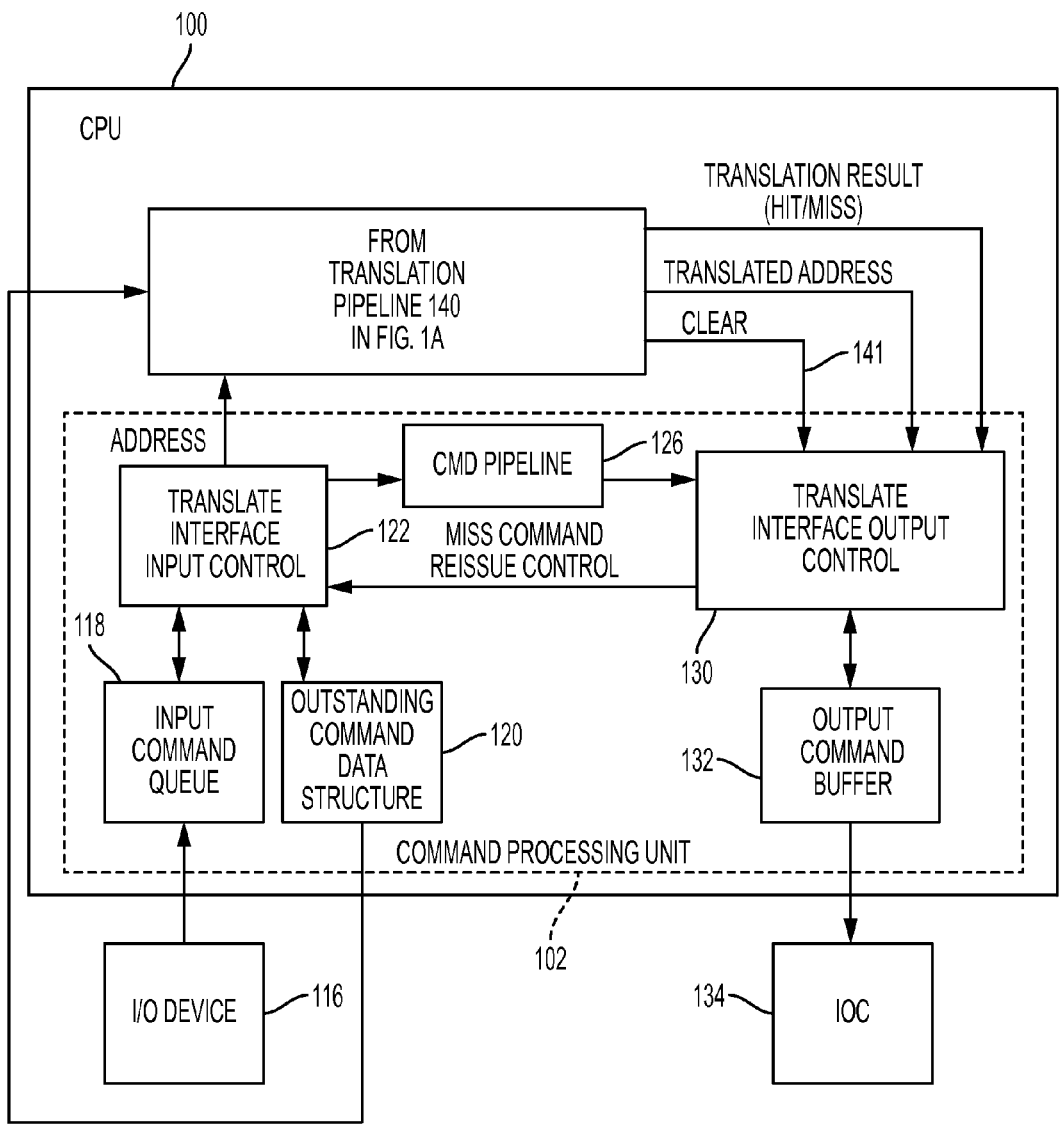

Referring now to FIGS. 1A and 1B where an apparatus for maintaining command order of address translation cache misses and subsequent hits via a dynamic linked list is generally shown in accordance with an embodiment. In an embodiment, the command order is maintained for a virtual channel or a central processor unit (CPU) generally designated by the reference 100 in FIGS. 1A and 1B. CPU 100 can include a command processing unit 102 shown in FIG. 1B; as well as an input/output (I/O) address translation unit 104, an embedded processor 106 together with software 108, a memory 110, and an element interconnect bus (EIB) 112 shown in FIG. 1A.

Addresses for commands are sent from the command processing unit 102 to the I/O address translation unit 104 in the order that the commands are received from an I/O device 116. This ordering can be assumed to be strict ordering because the ordering rules for the commands have not been read from the page table entry yet.

Referring to FIG. 1B, command processing unit 102 includes an input command queue 118 and an outstanding command data structure 120. The input command queue 118 maintains ordering of the commands from the I/O device 116. In an embodiment, the outstanding command data structure 120 includes one or more linked lists, with each linked list including commands that specify addresses that are located on the same hash which corresponds to pages in memory 110. In an embodiment, the linked list can be implemented as shown below in reference to FIG. 2 in order to preserve the order that the commands were received. By having one linked list of commands in the outstanding command data structure 120 for each hash, the order of the commands accessing the same page in memory is preserved. In an embodiment, nodes of the linked list(s) and associated metadata that make up the outstanding command data structure 120 are stored in a CAM for quick access.

When a command is received from the I/O device 116 it is stored temporarily in the input command queue 118. Commands are sent in the order received from the I/O device 116 to the translate interface input control 122. In another embodiment, the commands are sent directly to the translate interface input control 122. In an embodiment, the translate interface input control 122 checks the address of the incoming command against linked list metadata to determine whether the address is located on a memory page that has an associated linked list in the outstanding command data structure 120. If a CAM match is found, this indicates that a previous outstanding command for the matching hash is waiting for a memory fetch. In this case, the command can be added to the linked list and the address is not sent to the translation pipeline 140. If a CAM match is not found, then the translate interface input control 122 sends the address of the command to the translation pipeline 120, and the command to the translate interface output control 130.

In accordance with an embodiment, command processing unit 102 includes a translate interface input control 122 coupled to the input command queue 118 and the outstanding command data structure 120. The translate interface input control 122 provides the address to a pipeline 126 coupled to a translate interface output control 130. Command processing unit 102 includes the translate interface output control 130 coupled between command pipeline 126 and an output command buffer 132. Output command buffer 132 is coupled to an I/O controller (IOC) 134. The I/O address translation unit 104 provides the translate interface output control 130 with a hit or miss translation result, a translated address, and a CLEAR 141 signal to indicate that a fetch request for a cache miss has completed when a cache table entry is loaded into the cache. The cache table entry is indexed with the hash value of the address of the command. When a memory fetch is completed, the cache table entry is updated at the hash index. The translate interface output control 130 provides a miss command reissue control signal to the translate interface input control 122.

As the addresses are passed from the command processing unit 102, two types of address translation misses can occur including a segment table cache miss and a page table cache miss. When a translation cache miss occurs, the I/O address translation unit 104 performs a memory fetch to get the page or segment table entry depending on the type of the cache miss. Since this logic is pipelined, addresses are presented to the translation logic continually, so even when a cache miss occurs, addresses following that miss still are processed.

Referring to FIG. 1A, I/O address translation unit 104 includes a translation pipeline 140 providing a plurality of signals to the translate interface output control 130 in FIG. 1B, including translation results (hit/miss), a translated address, and a CLEAR 141, which indicates to the command processing unit 102 that it should re-issue a translation request for a given command(s) at the indicated address. In an embodiment, this causes the translate interface input control 122 to locate the linked list associated with the indicated address and to reissue all of the commands in the linked list (i.e., because they all access the same hash which is now in the cache). The translate interface input control 122 may reissue commands in a linked list when a memory fetch has completed. The memory fetch handler 150 has a list of head pointers that corresponding to outstanding linked lists. The head pointer is returned with the memory fetch completion to indicate which linked list to resubmit. The translation pipeline 140 is coupled to the EIB bus 124, a page cache 142, such as a 4-way page cache, a segment cache 144, and a miss fetch unit 146. The miss fetch unit 146 applies a fetch request to the memory 110 via the EIB 112. A fetch data handler 150 receives fetched data corresponding to the address from memory 110 via the EIB 112.

In an embodiment, the command processing unit 102 sends an address from the translate interface input control 122 to the translation pipeline 140 of the I/O address translation unit 104. The segment table cache 144 is searched for the corresponding segment table entry, and the page table cache 142 is searched for the corresponding page table entry. When an address translation cache miss occurs and does not match an outstanding command, a memory fetch request is sent by miss fetch unit 146 to the memory controller or memory 110 via the EIB 112. These memory fetches have unique identifiers so that when the return data comes back from memory 110, the unit that sent the request accepts the data based on a return tag match. This allows the translation logic or fetch handler 150 to know where to put the data and also to send back the address to the command processing 102 so that the command can be re-issued.

Once the page table or segment entry has been loaded into the appropriate cache 142 or 144, the address is passed back to the translate interface output control 130 of command processing unit 102 with a CLEAR 141 signal to indicate that the fetch has completed and that it can re-issue the address translation requests for that hash because the cache entry has been loaded.

Embodiments provide a method of implementing hit-under-miss and miss-under-miss for I/O commands. Addresses that get cache hits during an outstanding miss and map to the same hash are called hits-under-miss. Addresses that get cache misses during an outstanding miss and map to the same hash are referred to as miss-under-miss.

Figure 2:
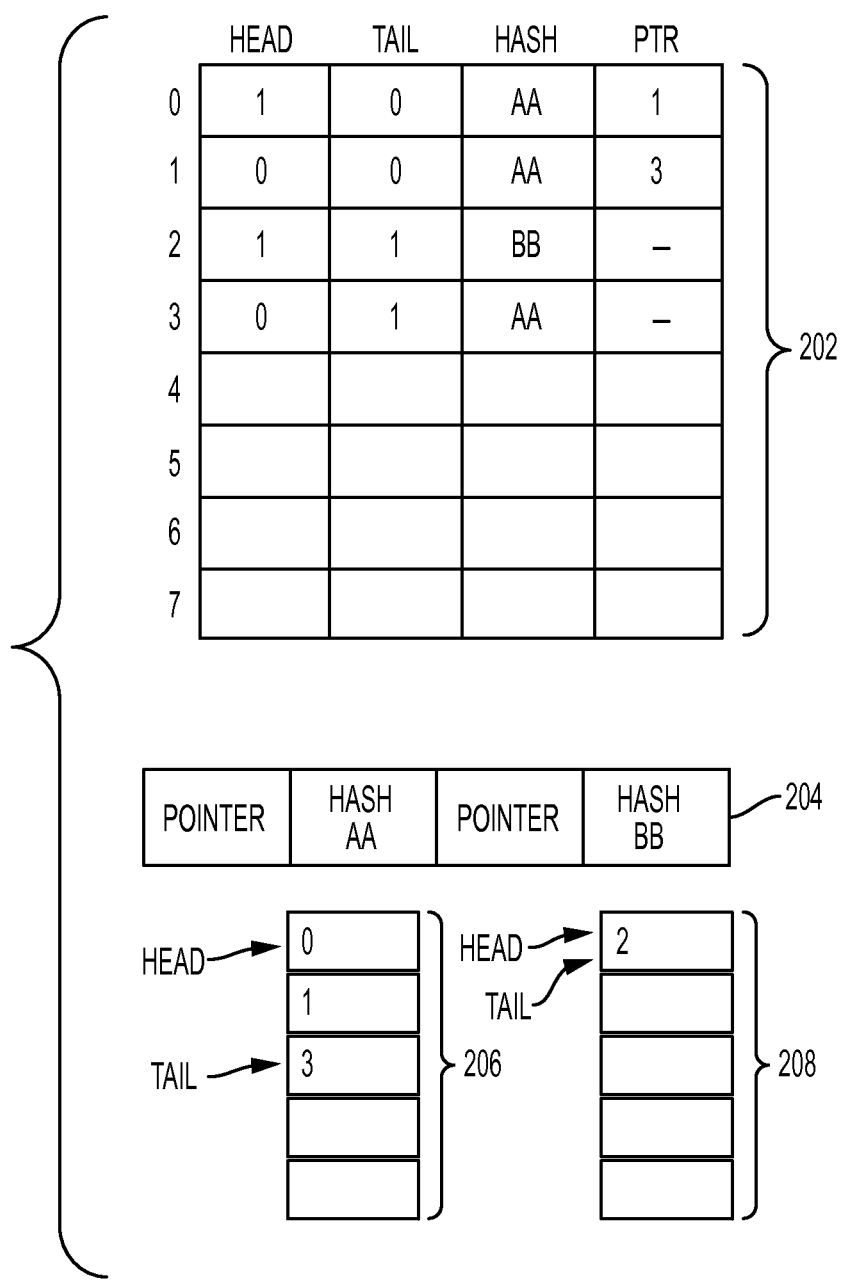
FIG. 2 depicts linked list data structures for maintaining command order of address translation cache misses and subsequent hits in accordance with an embodiment.

Referring now to FIG. 2, an outstanding command data structure 120 that includes linked lists for maintaining command order of address translation cache misses and subsequent hits is generally shown in accordance with an embodiment. In an embodiment, an outstanding command linked list data structure 202 is stored in a CAM, with each CAM entry storing a node in the linked list. The embodiment of the outstanding command linked list data structure 202 shown in FIG. 2 includes, for each node, a head bit, a tail bit, a hash value, and a pointer to the next node. Referring to the linked list data structure 202 in FIG. 2, a linked list 206 for hash value AA has three nodes/commands. Node 0 is the head of the list because it has the head bit asserted, and it points to node 1. Node 1 is neither the head nor the tail, and it points to node 3. Node 3 is the tail of the list because it has the tail bit asserted. Another linked list 208 exists for hash value BB at node 2. Node 2 has the head and tail bits because it is the only node in the list.

As shown in the embodiment in FIG. 2, there is a separate table, referred to as a head pointer table 204 in the CAM that keeps a list of head pointers and their associated hash values. A head pointer is stored when a new linked list is created and is returned (removed) when a page walk (memory fetch) has completed. The command at the head of the list and any commands after the head will be returned in the order that they appear in the list. Therefore, command ordering is guaranteed.

Figure 3:
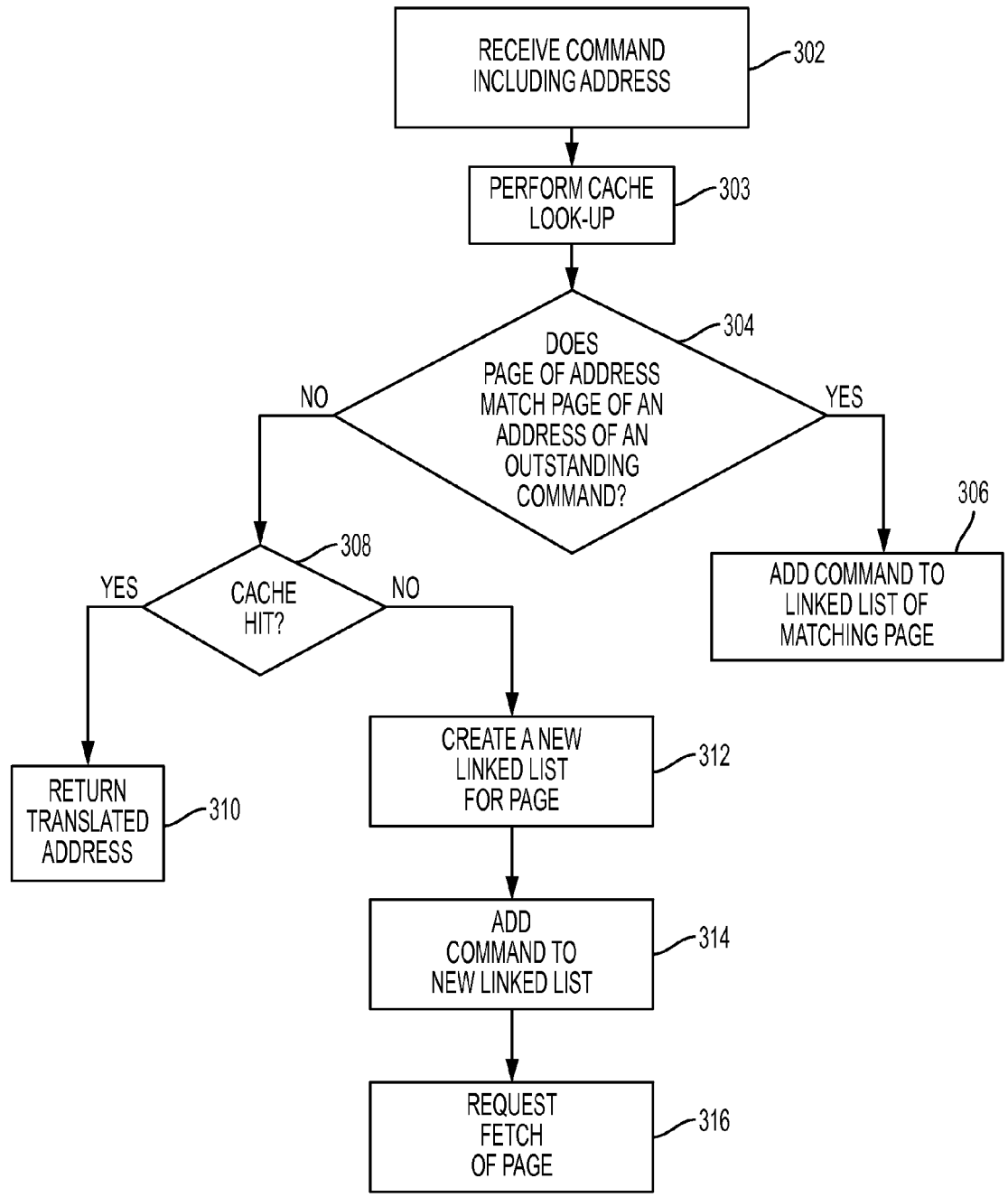
FIG. 3 is a flow diagram of a method for processing and maintaining command order of incoming address translation commands in accordance with an embodiment.

FIG. 3 is a flow diagram of a method for processing and maintaining command order of incoming address translation commands in accordance with an embodiment. At block 302, a command and address are received by the translate interface input control 122, and at block 303, a cache look-up is performed for the incoming command. At block 304 a check is made to determine if the hash where the address is located in memory 110 matches the hashes corresponding to any of the linked lists in the linked list data structure 202. The matching includes performing a CAM lookup on the tail bit in the linked list data structure 202 using the hash value of the address. The CAM lookup can have two outcomes, the compare is false or the compare is true.

If the CAM compare is false, then this indicates that there are no outstanding commands waiting for translation for the hash associated with the address of the command, and processing continues at block 308. If the address of the incoming command had a cache hit at block 303, then the processing at block 310 is performed and the translated address and command are returned, via the output command buffer 132 to the IOC 134. If the incoming command had a cache miss at block 303, then it will be stored in a CAM entry, with the head and tail bits asserted to indicate that a new linked list is created. At block 312 a new linked list is created in the CAM for the hash associated with the address, at block 314 the command is added to the new linked list, and at block 316 a fetch is requested for the page. Both the head and tail bits are asserted in the node indicating that a new linked list is created.

If the CAM compare is true, then this indicates that there is at least one outstanding command waiting for translation of an address at the hash corresponding to the address of the command and processing continues at block 306 to process a CAM match. Regardless of whether the incoming command had a cache hit or miss, it will be stored in a CAM entry and will be added to an existing linked list. In an embodiment, the translation interface unit control 122 does not send the command to translation pipeline 140 when a CAM match occurs. The new CAM entry has its tail bit asserted indicating that it is the newest node added to the list. The previous node in the list will then point to the newest node and it's tail bit is de-asserted.

Figure 4:
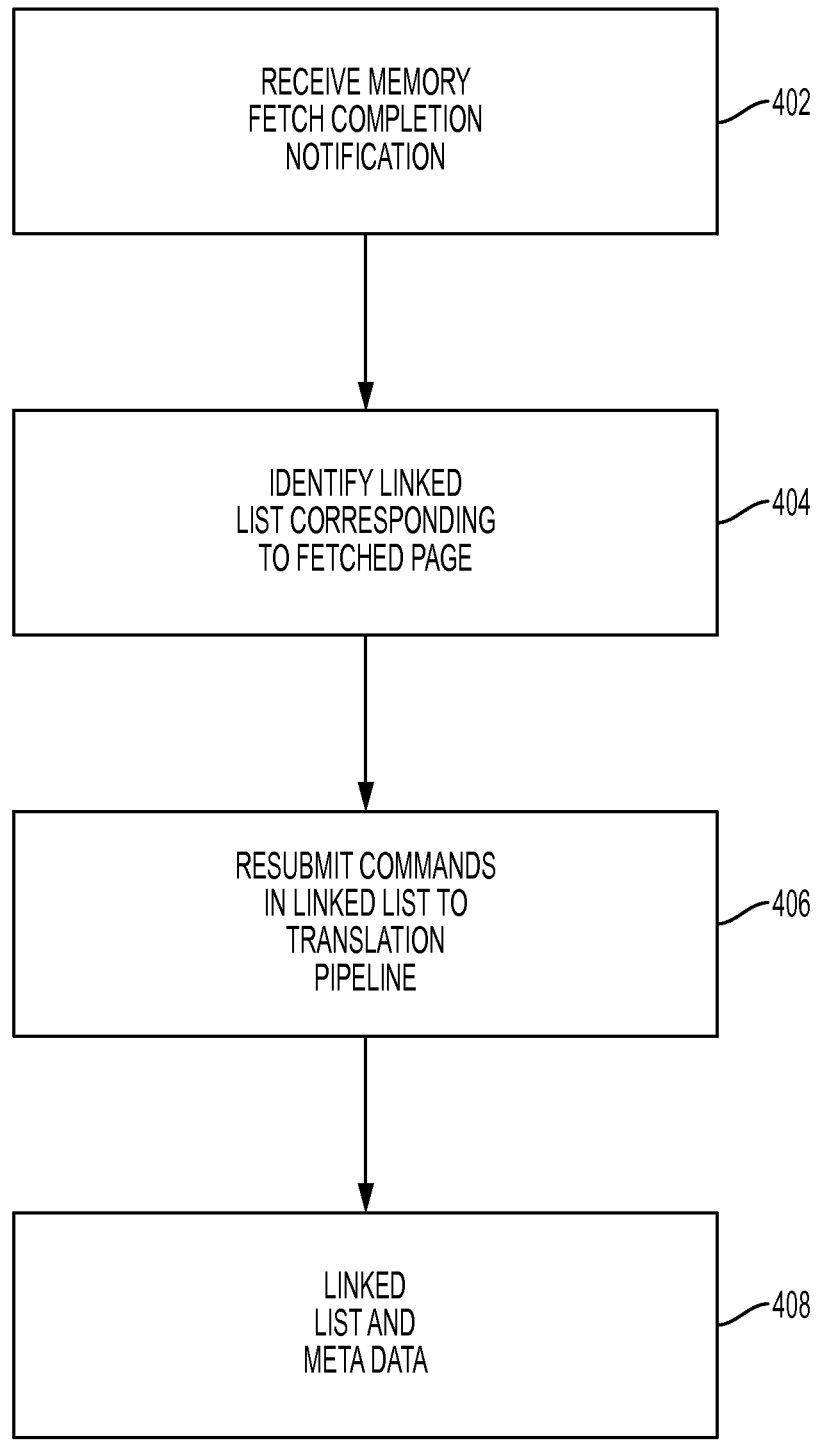
FIG. 4 is a flow diagram of a method for processing a fetch completion in accordance with an embodiment.

FIG. 4 is a flow diagram of a method for processing a fetch completion in accordance with an embodiment. At block 402, an indication that a fetch of a page from memory has been completed and the page is stored in the cache is received by the translate interface input control 122. At block 404, the linked list in the linked list data structure 202 that corresponds to the fetched page is identified. In an embodiment, this is performed by performing a CAM lookup of the page in the head pointer table 204. At block 406, each of the commands and their associated addresses, in order of receipt by the command processing unit 102 are resubmitted to the translation pipeline 140. In this manner, all outstanding commands for a particular page are processed in order once the page is stored in the cache. At block 408, the linked list and metadata for the page are removed from the CAM.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
    a processor comprising a command processing unit and an address translation unit, the system configured to perform a method comprising:
    storing commands and maintaining an order of receipt of the commands in the command processing unit, the commands including address translation cache miss commands that are organized as one or more linked lists and stored in a content-addressable memory (CAM), all nodes within a single linked list including commands having addresses that map to the same hash value;
    based on receiving a memory fetch completion indicator for a cache entry for a command in a head node in a linked list, returning all of the commands in the linked list, the returning including sending the commands in the linked list to the address translation unit in an order specified by the linked list;
    based upon receiving an incoming command:
        performing a CAM-lookup to determine whether an address included in the incoming command maps to a hash value that matches a hash value of a node in one of the linked lists;
        based on determining that the address included in the incoming command maps to a hash value that matches a hash value of a node in one of the linked lists, adding the command to the one of the linked lists; and
        based on determining that the address included in the incoming command does not map to a hash value that matches a hash value of a node in one of the linked lists, sending the incoming command to the address translation unit.

2. The system of claim 1, wherein the system is further configured for:
    receiving an indicator of an address translation cache miss for the incoming command; and
    creating a new linked list that includes the incoming command.

3. The system of claim 1, wherein the CAM also includes a head pointer table which includes a pointer to a head node in each linked list.

4. The system of claim 3, wherein the head pointer table also identifies a hash value associated each linked list.

5. The system of claim 1, wherein each node includes a head bit for indicating whether the node is the head node in the linked list, a tail bit for indicating whether the node is a tail node in the linked list, a hash value, and a pointer to a next node in the linked list.

6. The system of claim 5, wherein the pointer is a row number of a CAM table where the linked list is stored.

7. The system of claim 1, wherein the CAM includes a single linked list.

8. A computer program product comprising a computer readable storage medium having program instructions embodied therewith, the program instructions executable by a processor to cause the processor to perform a method comprising:
    storing commands and maintaining an order of receipt of the commands in a command processing unit, the commands including address translation cache miss commands that are organized as one or more linked lists and stored in a content-addressable memory (CAM), all nodes within a single linked list including commands having addresses that map to the same hash value;
    based on receiving a memory fetch completion indicator for a cache entry for a command in a head node in a linked list, returning all of the commands in the linked list, the returning including sending the commands in the linked list to an address translation unit in an order specified by the linked list;
    based upon receiving an incoming command:
        performing a CAM-lookup to determine whether an address included in the
    incoming command maps to a hash value that matches a hash value of a node in one of the linked lists;
        based on determining that the address included in the incoming command maps to a hash value that matches a hash value of a node in one of the linked lists, adding the command to the one of the linked lists; and
        based on determining that the address included in the incoming command does not map to a hash value that matches a hash value of a node in one of the linked lists, sending the incoming command to the address translation unit.

9. The computer program product of claim 8, wherein the method further comprises:
    receiving an indicator of an address translation cache miss for the incoming command; and
    creating a new linked list that includes the incoming command.

10. The computer program product of claim 8, wherein the CAM also includes a head pointer table which includes a pointer to a head node in each linked list.

11. The computer program product of claim 10, wherein the head pointer table also identifies a hash value associated each linked list.

12. The computer program product of claim 8, wherein each node includes a head bit for indicating whether the node is the head node in the linked list, a tail bit for indicating whether the node is a tail node in the linked list, a hash value, and a pointer to a next node in the linked list.

13. The computer program product of claim 12, wherein the pointer is a row number of a CAM table where the linked list is stored.

* * * * *